US008194091B2

(12) United States Patent
Sugamata

(10) Patent No.: US 8,194,091 B2
(45) Date of Patent: Jun. 5, 2012

(54) PORTABLE DISPLAY DEVICES AND PROGRAMS

(75) Inventor: Hiroki Sugamata, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 369 days.

(21) Appl. No.: 12/538,107

(22) Filed: Aug. 7, 2009

(65) Prior Publication Data

US 2010/0033491 A1 Feb. 11, 2010

(30) Foreign Application Priority Data

Aug. 7, 2008 (JP) ................................ 2008-204437

(51) Int. Cl.
*G09G 5/397* (2006.01)
*G09G 5/00* (2006.01)
*G06F 3/048* (2006.01)
*G06F 3/02* (2006.01)

(52) U.S. Cl. ......... 345/546; 345/169; 715/867; 713/323

(58) Field of Classification Search ........................ None
See application file for complete search history.

(56) References Cited

U.S. PATENT DOCUMENTS

| | | | | |
|---|---|---|---|---|
| 2004/0070553 A1* | 4/2004 | Youden | ........................... | 345/13 |
| 2004/0225901 A1* | 11/2004 | Bear et al. | ..................... | 713/300 |
| 2006/0026445 A1 | 2/2006 | Ono | | |
| 2008/0100636 A1* | 5/2008 | Lai et al. | ....................... | 345/546 |
| 2008/0168290 A1* | 7/2008 | Jobs et al. | ..................... | 713/324 |

FOREIGN PATENT DOCUMENTS

| | | | |
|---|---|---|---|
| EP | 1408402 | A2 | 4/2004 |
| EP | 1624365 | A2 | 2/2006 |
| JP | 2005-266191 | A | 9/2005 |
| JP | 2007-187927 | A | 7/2007 |

OTHER PUBLICATIONS

European Patent Office, Extended European Search Report for European Patent Application No. 09010181.7, dated Nov. 5, 2010.
European Patent Office, Office Action for European Patent Application No. 09010181.7, dated Aug. 16, 2011.

* cited by examiner

*Primary Examiner* — Daniel Washburn
*Assistant Examiner* — Donna Ricks
(74) *Attorney, Agent, or Firm* — Baker Botts L.L.P.

(57) ABSTRACT

A portable display device transitions between a first and second state. The device has a display portion, a power source for supplying power in the first state and supplying less power in the second state than in the first state, a controller that drives the display portion, an operation portion that executes commands, and a mode storage portion that stores one of a first and second mode. The first mode corresponds to displaying preset information, and the second mode corresponds to particular information to be continuously displayed. The particular information is information displayed in the display portion when the device is in the first state. When the device is in the second state, the preset information is displayed in the display portion when the first mode is stored in the mode storage portion, and the particular information is continuously displayed when the second mode is stored in the mode storage portion.

9 Claims, 9 Drawing Sheets

Fig. 3A

| OBJECT | POWER-OFF DISPLAY INFORMATION |
| --- | --- |
| DEVICE | DIFFERENT DISPLAY |

Fig. 3B

| OBJECT (CONTENT NAME) | POWER-OFF DISPLAY INFORMATION |
| --- | --- |
| DOCUMENT A | DIFFERENT DISPLAY |
| DOCUMENT D | DEVICE-BASED |
| DOCUMENT E | CONTINUING DISPLAY |
| DOCUMENT F | DIFFERENT AND CONTINUING DISPLAY |
| DOCUMENT H | DIFFERENT DISPLAY |

Fig. 9A

| OBJECT | POWER-OFF DISPLAY INFORMATION |
|---|---|
| DEVICE | INFORMATION 1 |
| | INFORMATION 2 |
| | INFORMATION 3 |

Fig. 9B

| CLASSIFICATION | OBJECT | POWER-OFF DISPLAY INFORMATION |
|---|---|---|
| CONFIDENTIALITY | CONFIDENTIAL INFORMATION | WARNING DISPLAY |
| | NOT CONFIDENTIAL INFORMATION | - |
| SECURITY LEVEL | PREDETERMINED LEVEL OR GREATER | WARNING DISPLAY |
| | LESS THAN PREDETERMINED LEVEL | - |
| CONTENTS | DOCUMENT A | INFORMATION 4 |
| | | INFORMATION 5 |
| CONTENT TYPE | TYPE A | DEVICE-BASED |
| FOLDERS CONTAINING CONTENTS | FOLDER A | CONTINUING DISPLAY |
| CONTENT NAMES | NAME A | CONTINUING DISPLAY |

PORTABLE DISPLAY DEVICES AND PROGRAMS

CROSS REFERENCE TO RELATED APPLICATION

The present application claims priority from Japanese Patent Application No. 2008-204437, which was filed on Aug. 7, 2008, the disclosure of which is incorporated herein by reference in its entirety.

BACKGROUND OF THE INVENTION

1. Field of the Invention

The invention relates to portable display devices and programs, and more particularly to portable display devices and programs for maintaining a display image or information in the portable display devices even when power from a power source is turned off.

2. Description of Related Art

A known portable display device, e.g., electronic paper viewer, e.g., a device described in Japanese Laid-Open Patent Publication No. 2007-187927, includes a non-volatile display device configured to maintain display information, e.g., an image, even when power supply from a power source is turned off. The portable display device is configured to maintain information, when power is turned off. Therefore, a user may view the information even in a state of power-off. Another known portable display device is configured, for security reasons, to erase information displayed in a non-volatile display device immediately before power is turned off and make different display, e.g., display another information such as textual information, e.g., "Power off," in the non-volatile display device.

In the above-described display devices, a user is not able to select which information is displayed in a state of power-off, information displayed immediately before power is turned off, or another information, e.g., different display. Thus, information that a user desires may not be displayed in the non-volatile display device in a state of power-off, which may be inconvenient for users. Further, information that the user would not like to show other users may be unintentionally displayed in the non-volatile display device.

SUMMARY OF THE INVENTION

Therefore, a need has arisen for portable display devices which overcome these and other shortcomings of the related art. A technical advantage of the invention is that a portable display device and a program for displaying information intended by a user in a non-volatile display device when power-off is turned off.

In an embodiment of the invention, a portable display device is configured to transition between a first state and a second state, and the portable display device comprises a display portion configured to display information when the portable display device is in the first state and when the portable display device is in the second state, a power source configured to supply power when the portable display device is in the first state, and to supply less power when the portable display device is in the second state than when the portable display device is in the first state, a controller configured to drive the display portion to display information in the display portion, an operation portion configured to execute at least one command in response to receipt of at least one operation, and a mode storage portion configured to store one of a first mode and a second mode, based on an operation of the operation portion, wherein the first mode corresponds to configuring preset information to be displayed in the display portion, and the second mode corresponds to configuring a particular information to be continuously displayed in the display portion, wherein the particular information corresponds to information displayed in the display portion when the portable display device is in the first state, wherein when the portable display device is in the second state, the controller is configured to display the preset information in the display portion when the first mode is stored in the mode storage portion, and to continuously display the particular information when the second mode is stored in the mode storage portion.

In another embodiment of the invention, a computer program product having computer readable instructions stored thereon, which, when executed by a processor of a portable display device, configures the processor to perform the steps of driving a display portion to display information when the portable display device is in a first state, the first state corresponding to the portable display device receiving a power supply from a power source, receiving at least one operation command from at least one operation portion, storing one of a first mode and a second mode in a mode storage portion, wherein the first mode corresponds to displaying preset information in the display portion, and the second mode corresponds to continuously displaying a particular information, wherein the particular information corresponds to information displayed in the display portion when the portable display device is in the first state, transitioning the portable display device from the first state to a second state, the second state corresponding to the portable display device receiving less power from the power source than when the portable display device is in the first state, displaying the preset information in the display portion when the portable display device is in the second state and the first mode is stored in the mode storage portion, and continuously displaying, when the portable display device is in the second state and the second mode is stored in the mode storage portion, information displayed in the display portion when the portable display device is in the first state.

Other objects, features, and advantages of embodiments of the invention will be apparent to persons of ordinary skill in the art from the following description of embodiments with reference to the accompanying drawings.

BRIEF DESCRIPTION OF THE DRAWINGS

For a more complete understanding of the invention, the needs satisfied thereby, and the objects, features, and advantages thereof, reference now is made to the following description taken in connection with the accompanying drawings.

FIGS. 3A and 3B are schematics showing power-off display tables, according to an embodiment of the invention.

FIGS. 9A and 9B are schematics showing power-off display tables according to another embodiment of the invention.

DETAILED DESCRIPTION OF EMBODIMENTS OF THE INVENTION

Embodiments of the invention and their features and technical advantages may be understood by referring to FIGS. 1-9B, like numerals being used for like corresponding portions in the various drawings.

Figure 1:
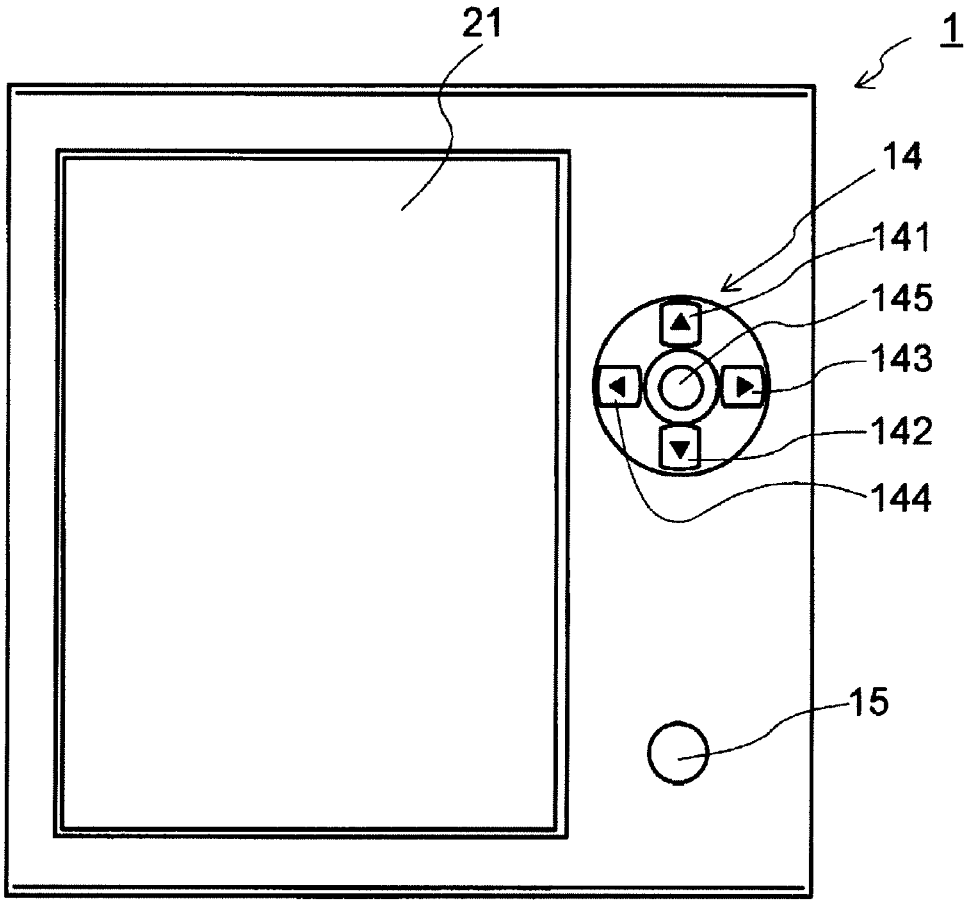
FIG. 1 is a front view of a portable display device, according to an embodiment of the invention.

Referring to FIG. 1, a portable display device 1 according to an embodiment of the invention may have a substantially rectangular parallelepipedonal shape. Portable display device 1 may comprise an electrophoretic display portion 21. Electrophoretic display portion 21 may be disposed on a front surface of portable display device 1. A right side of portable display device 1 in FIG. 1 may comprise a card slot (not shown) into which a memory card 23 in FIG. 2 may be inserted. Portable display device 1 may display contents, e.g., contents stored in memory card 23, on electrophoretic display portion 21. In this embodiment, information, e.g., at least one of a text, a freeze-frame image, and a moving image, may be displayed based on the contents. Content data may comprise at least one piece of data for displaying a text, a freeze-frame image, and a moving image.

Portable display device 1 in FIG. 1 may comprise operation keys 14 that may be operated by a user. In an embodiment of the invention, as shown in FIG. 1, operation keys 14 may be positioned to the right of and substantially adjacent to electrophoretic display portion 21. Operation keys 14 may comprise at least an enter key 145, and an up arrow key 141, a down arrow key 142, a right arrow key 143 and a left arrow key 144. Keys 141, 142, 143, and 144 may be disposed on the upper, lower, right and left side of enter key 145, respectively. For example, up arrow key 141 and down arrow key 142 may be used to select a content in a screen listing contents or a menu screen. Right arrow key 143 and left arrow key 144 may be used to turn pages of a content displayed in electrophoretic display portion 21. A content stored in memory card 23 may be displayed in display portion 21 or instructions for various settings may be provided, with the operations of operation keys 14 according to the information displayed in electrophoretic display portion 21. Moreover, a power key 15 may be disposed on a portion of device 1 below operation keys 14 in FIG. 1. Power key 15 may provide instructions for turning power on or off.

Figure 2:
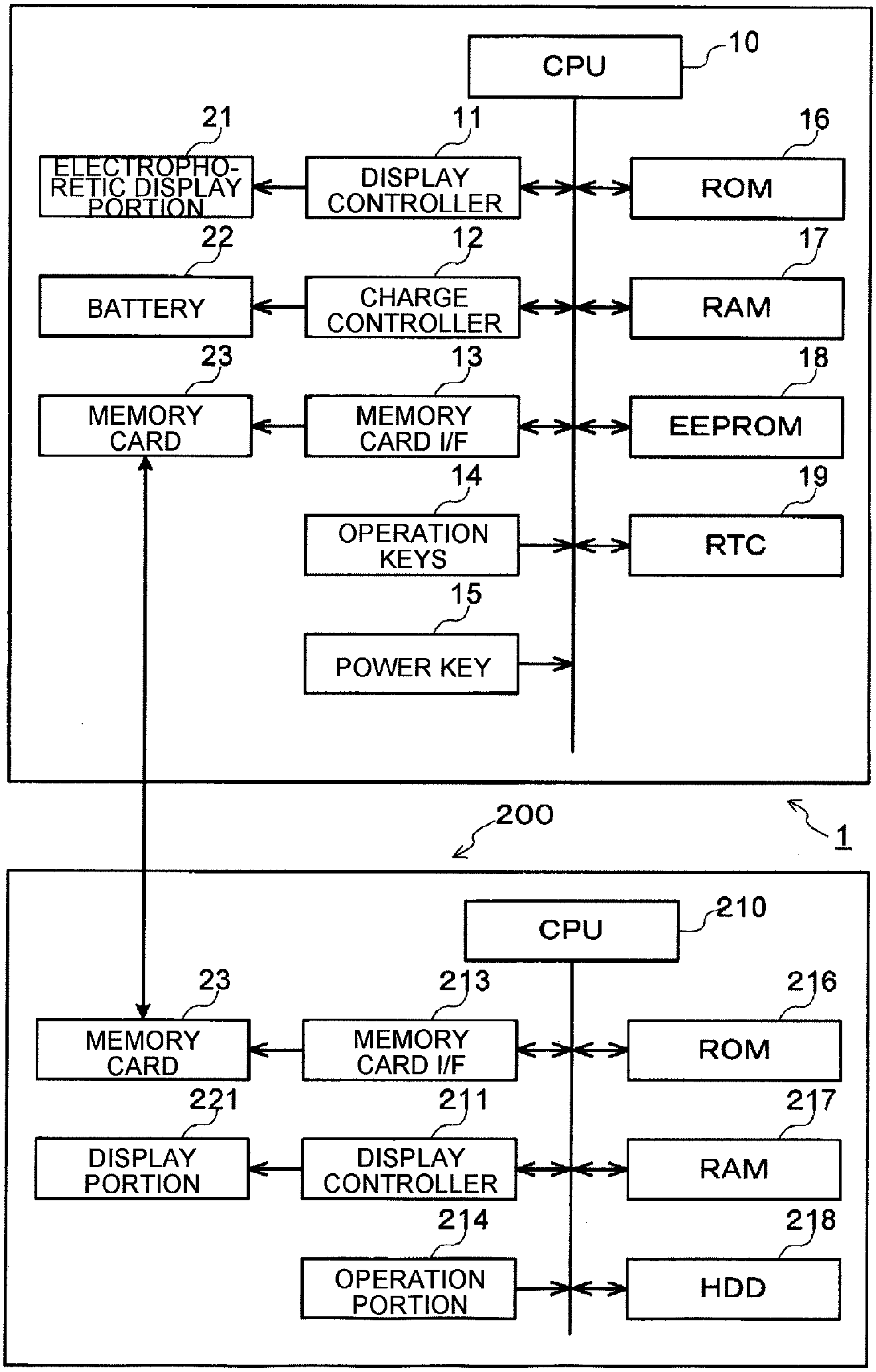
FIG. 2 is a schematic showing an electrical configuration of the portable display device and an external device, according to an embodiment of the invention.

Referring to FIG. 2, device 1 may comprise a central processing unit ("CPU") 10, a display controller 11, a charge controller 12, a memory card interface ("I/F") 13, operation keys 14, power key 15, a read-only memory ("ROM") 16, a random access memory ("RAM") 17, an electrically erasable programmable read-only memory ("EEPROM") 18, and a real time clock ("RTC") 19.

CPU 10 may perform control of device 1. CPU 10 may drive display portion 21 to display information therein. ROM 16 may store various data and programs for operating device 1. RAM 17 may temporarily store various data. EEPROM 18 may be a non-volatile memory and store various data, such as a power-off display table which will be discussed in more detail herein. RTC 19 may measure time. Display controller 11 may control a display in the display portion 21. Memory card I/F 13 may control reading data from memory card 23, and writing of data into memory card 23. Device 1 may be driven by power supplied from a battery 22 when power is not supplied from an external power source (not shown). Battery 22 may be a rechargeable type of battery. There may be two power supply routes from a power source, e.g., battery 22 or the external power source, one for CPU 10 and the other for peripheral devices, such as ROM 16, RAM 17, EEPROM 18, and display controller 11. Charge controller 12 may control a delivery of charge to battery 22 from the external power source.

Device 1 may be configured to transition between a first state, e.g., a power-on state, in which power is supplied to device 1 and the components which device 1 comprises, and a second state, e.g., a power-off state, in which power is not supplied to device 1 and the components which device 1 comprises. These states will be discussed in more detail herein.

When device 1 is in a power-off state, pressing power key 15 or any of operation keys 14, may cause an instruction to turn power on to be provided. Upon receipt of this instruction, CPU 10 and the peripheral devices may receive power supplied from the power source. Thus, device 1 may be brought into an operational state. When device 1 is in a power-on state, pressing power key 15 may cause an instruction to turn power off to be provided. Upon receipt of this instruction, power supply to the peripheral devices and to CPU 10 may be suspended or stopped. When device 1 is in a power-on state, and a user does not operate any operation keys 14 for a predetermined period of time, e.g., a power-off setting time, device 1 may be determined to be in a non-operating state. In an embodiment of the invention, power key 15 may be disposed in device 1. In another embodiment of the invention, power key 15 may be omitted, and any key may function as power key 15 by pressing and holding the key for a predetermined amount of time.

In an embodiment of the invention, when device 1 is in a power-off state, any one, or a specific combination outlined below, of the following sets of conditions may be true:

(a) Power supply to CPU 10 may be suspended or stopped;

(b) Power supply to at least one of the peripheral devices (e.g., RAM 17, controllers such as display controller 11, display portion 21) may be suspended or stopped;

(c) At least one of the peripheral devices may be placed in a power-saving mode in which power consumption may be more saved than in a normal operation mode of the at least one of the peripheral devices; and (d) CPU 10 may be placed in a power-saving mode in which its power consumption may be more saved than its normal operation mode.

Specifically, any one of the previously listed conditions may be true when device 1 is in a power-off state. Moreover, any of the following combinations of conditions may be true when device 1 is in a power-off state:

(1) any combination of the previously-listed conditions (a)-(c); and (2) any combination of the previously conditions (b)-(d).

Device 1 may transition to the power-off when one or more of the following events occur: (1) when power key 15 is pressed; (2) when any of operation keys 14 are not pressed for a predetermined period of time; (3) when the remaining amount of battery 22 becomes smaller than a predetermined amount; and (4) when power is not supplied from battery 22 because battery 22 runs out or when battery 22 is not mounted on device 1.

Display portion 21 may be a non-volatile display portion and may maintain display information when power supply is suspended from the power source to display portion 21. Thus, the display information may be viewed in display portion 21 even while power is saved, e.g., in a power-off state.

Device 1 may be configured to read data from, or write data into, an external device 200, e.g., via memory card 23. External device 200 may be configured to provide device 1 with data of a content body, e.g., a document, and data regarding the information to be displayed in display portion 21, in association with the content, when the device 1 power is turned off. The information to be displayed in display portion 21 when the device 1 power is off may be hereinafter simply referred to as "power-off display information."

As shown in FIG. 2, device 200 may comprise a central processing unit ("CPU") 210, a display controller 211, a memory card interface ("I/F") 213, an operation portion 214, a read-only memory ("ROM") 216, a random access memory ("RAM") 217, a hard disk drive ("HDD") 218, and a display portion 221. CPU 210 may perform control of device 200. ROM 216 may store various data and programs for operating device 200. RAM 217 may temporarily store various data. HDD 218 may be a non-volatile storage medium configured to store various data for device 200. Display controller 211 may control display portion 221 to display information therein. Memory card I/F 213 may control reading data from and writing data into a memory device, e.g., memory card 23.

Figure 8:
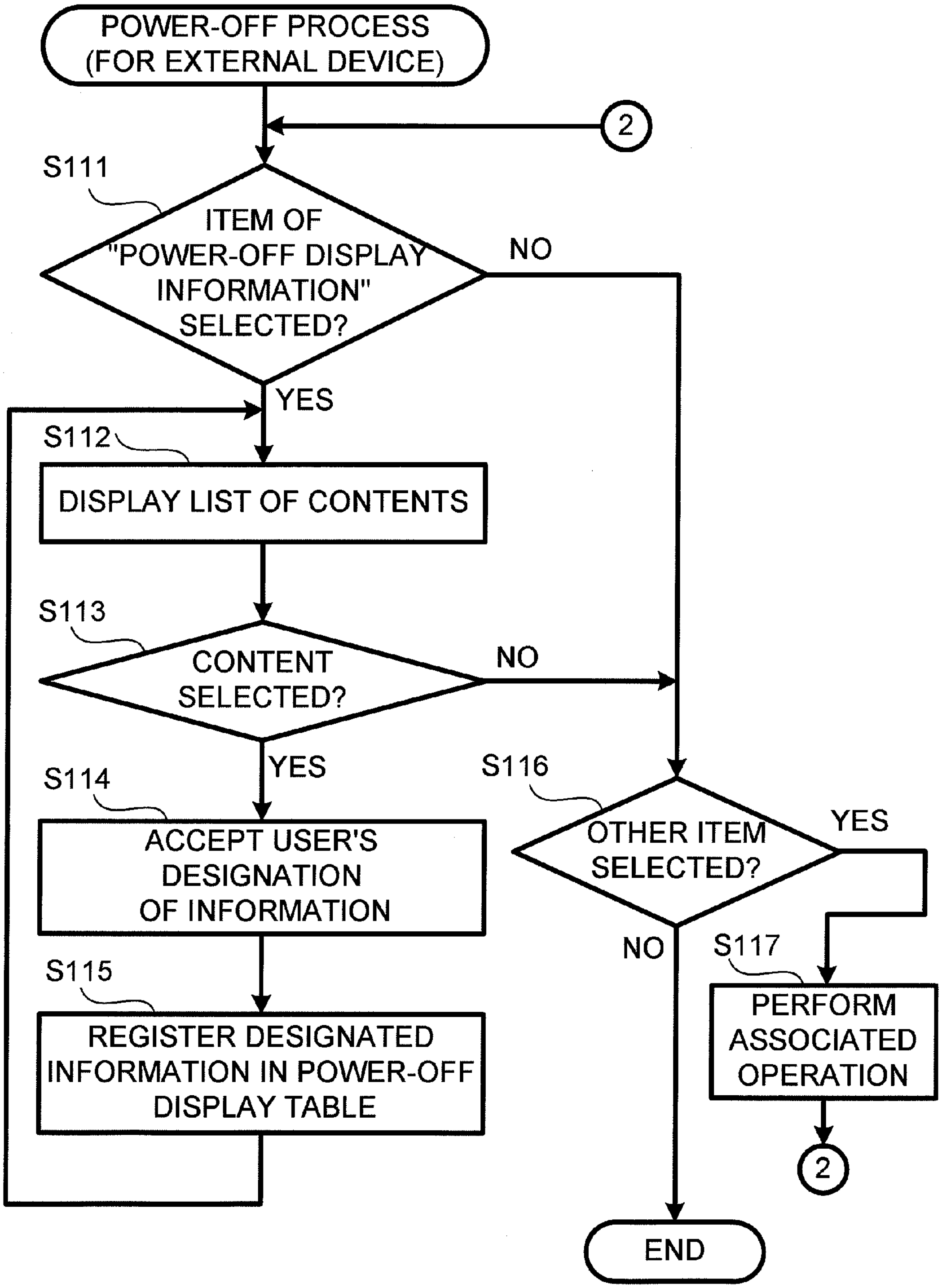
FIG. 8 is a flowchart showing operations performed in the external device, according to an embodiment of the invention.

Device 200 may provide device 1 with data associated with a content, via memory card 23. Device 200 also may provide device 1 with power-off display information, which may be set in association with a content. Device 200 further may provide device 1 with settings for the power-off display information. A method for performing such a process, according to an embodiment of the invention, is shown in FIG. 8, and will be discussed in more detail herein.

Display portion 21 may comprise an electrophoretic display panel (not shown), a gate driver (not shown) configured to output a gate signal to respective gate lines of the electrophoretic display panel, and a source driver (not shown) configured to output a source signal to respective source lines of the electrophoretic display panel. Display controller 11 may be configured to control the gate driver and the source driver of display portion 21. Display controller 11 may rewrite information displayed in display portion 21, based on a rewriting instruction received from CPU 10. The electrophoretic display panel may be an active matrix type. The electrophoretic display panel may comprise a transparent substrate positioned on a front side, e.g., a viewing side, and a rear substrate positioned opposite to the transparent substrate.

Electrophoretic display elements may be positioned between the transparent substrate and the rear substrate. The active matrix type-display panel may be configured to rewrite information displayed in display portion 21 by applying voltage to a common electrode positioned on the transparent substrate and a pixel electrode positioned on the rear substrate for each pixel. As the gate driver and the source driver receive the rewriting instruction from display controller 11, the date driver and the source driver may be configured to output a gate signal and a source signal corresponding to the information to be rewritten, to the gate lines and the source lines, respectively. A voltage for controlling the electrophoretic display elements may be applied to each pixel electrode to rewrite information displayed in the display panel.

FIGS. 3A and 3B refer to a power-off display table used to determine power-off display information, according to an embodiment of the invention. The power-off display table may comprise a power-off display table for device 1, as shown in FIG. 3A, and a power-off display table for contents, as shown in FIG. 3B. The power-off display table for device 1 may store settings of power-off display information for device 1. The power-off display table for contents may store settings of power-off display information for each of contents. The power-off display table may be stored in EEPROM 18 or memory card 23. In an embodiment of the invention, the power-off display table for device 1 may be stored in EEPROM 18, and the power-off display table for contents may be stored in memory card 23.

Operation keys 14 or operation portion 214 of external device 200 may be operated to update, add, or change the settings of the power-off display information in the power-off display table. The power-off display table may store settings of the power-off display information corresponding to an object for which power-off display information is set.

In an embodiment of the invention, various settings of power-off display information may comprise (1) different display; (2) continuing display; (3) different and continuing display; and (4) a device-based setting. Each of these four settings now will be described in more detail. When the different display setting is active, information, e.g., a power-off image, that is different from information displayed in display portion 21 in a power-on state, may be displayed in the power-off state. When the continuing display setting is active, information, e.g., a content, that is displayed in a power-on state immediately before power is turned off, may be continuously displayed when the device transitions to the power-off state. When the different and continuing display setting is active, a power-off image may be displayed when power is turned off, and information displayed in a power-on state before power is turned off may be again displayed when power is turned on, and the device transitions back from a power-off state to the power-on state.

When the device-based setting is active, the power-off display information may be determined based on the settings stored in the power-off display table for device 1. The device-based setting may be set only in the power-off display table for contents. In an embodiment of the invention, the default setting for the device-based setting may be set to a content. For example, as shown in FIG. 3B, the device-based setting may be set to document D in the power-off display table for contents. As shown in FIG. 3A, when power is turned off while display portion 21 displays document D, the power-off table for device 1 may be referred to and the different display, e.g., the power-off image, may be displayed in display portion 21 accordingly, according to the setting in the power-off display table for contents.

EEPROM 18 or memory card 23 may store either a first mode or a second mode based on user's operations. The first mode may be, for example, the different display setting and the different and continuing display setting in which preset information may be displayed in display portion 21 in a power-off state. The second mode may be, for example, the continuing display setting in which information displayed in display portion 21 in a power-on state may be continuously displayed in the power-off state. EEPROM 18 or memory card 23 also may store a power-off image that may be displayed in display portion 21 when the different display or the different and continuing display setting is set. One or both of EEPROM 18 and memory card 23, or a portion thereof, may be configured to act as an information storage portion configured to store preset information, e.g., a power-off image.

Figure 4A:
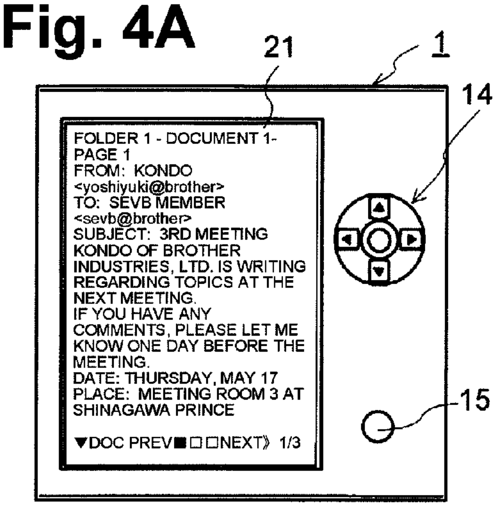
FIGS. 4A-4F are schematics showing an electrophoretic display device of the portable display device, according to an embodiment of the invention.
Figure 4D:
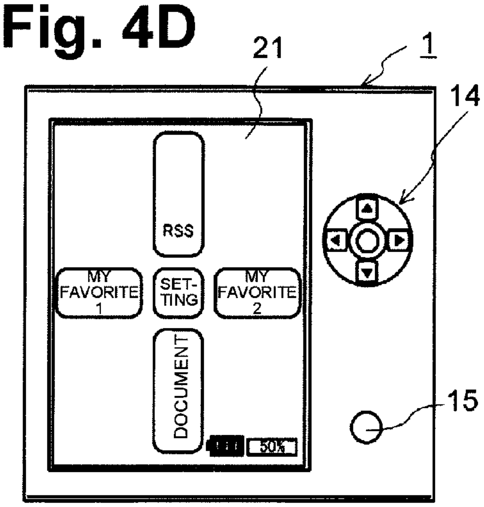

Display portion 21 may display various information when the power of device 1 is on, e.g., an e-mail message, as shown in FIG. 4A. A lower portion of a display area of display portion 21, e.g., a footer portion, also may display information, such as a page number. The information displayed in the footer portion may be related to the various information displayed, or the information displayed in the footer portion may be unrelated to the various information.

In a power-on state, when power key 15 is pressed, or any of operation keys 14 is not pressed for the period of the power-off setting time, power may be turned off, e.g., device 1 may transition to a power-off state. If the continuing display setting is set for a content being displayed in display portion 21, e.g., e-mail message shown in FIG. 4A, an upper portion of the display area of display portion 21 may maintain the content, e.g., e-mail message, and the lower portion of the display area of display portion 21 may display a power-off message, e.g., "Power off," as shown in FIG. 4B.

Figure 4B:
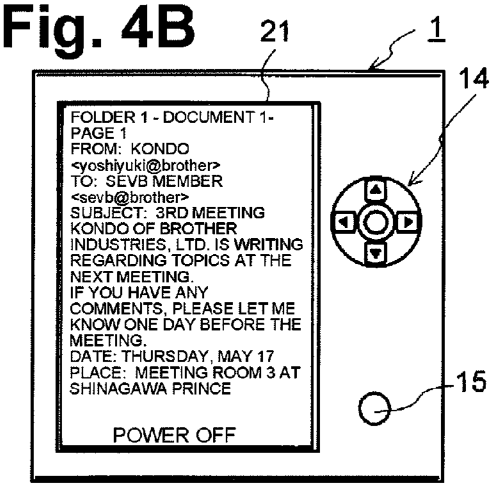

When power key 15 or any of operation keys 14 is pressed while device 1 is in a power-off state, e.g., as shown in FIG. 4B, device 1 may transition to a power-on state, e.g., power may be turned on. At this time, display portion 21 may display information, e.g., e-mail message shown in FIG. 4A, again.

Figure 4E:
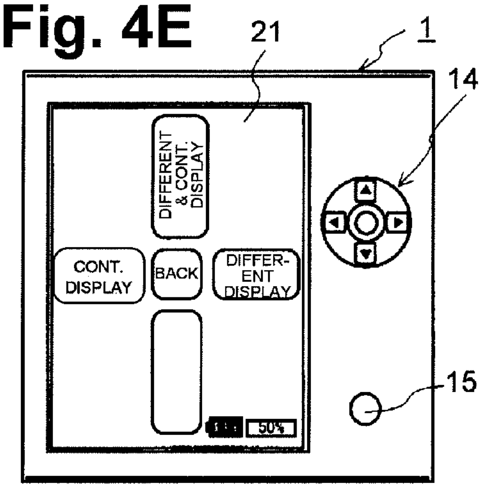
Figure 4C:
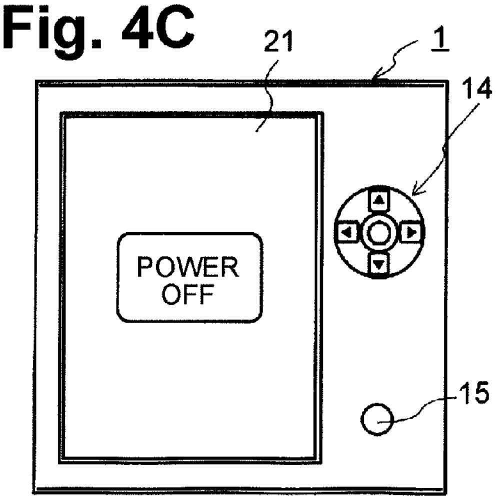

If the different display setting or the different and continuing display setting is set for a content, the content being displayed in display portion 21 may be erased and a power-off image, e.g., the power-off image shown in FIG. 4C, may be displayed in display portion 21. A middle portion of the power-off image may indicate such a message, e.g., "Power-off." Thus, information displayed in display portion 21 immediately before power is turned off, may be erased from the display portion 21, and display portion 21 may display a power-off image, which may increase information security. When power key 15 or any operation key 14 is pressed while device 1 is in a power-off state, as shown in FIG. 4C, device 1 may transition to a power-on state, e.g., power may be turned on. If the different display setting is set for a content, display portion 21 may display a content, e.g., a top page, e.g., the content shown in FIG. 4D.

When power key 15 or any operation key 14 is pressed when device 1 is in a power-off state, as shown in FIG. 4C, device 1 may transition to a power-on state, e.g., power may be turned on, as described above. If the different and continuing display setting is set for a content, display portion 21 may display, e.g., an e-mail message shown in FIG. 4A, that was displayed in display portion 21 in a power-on state immediately before power is turned off.

Figure 4F:
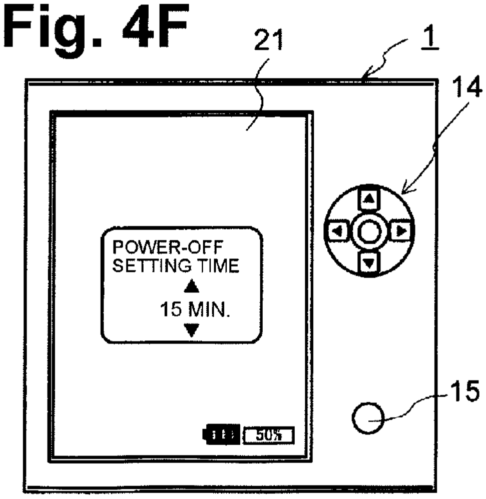

In order to set power-off display information for device 1, display portion 21 may display a screen as shown in FIG. 4E. Power-off display information for device 1 may be set by operations of operation keys 14. In order to set power-off setting time for device 1, display portion 21 may display a screen as shown in FIG. 4F. Power-off setting time for device 1 may be set by operations of operation keys 14. When device 1 is in a power-on state, and the power-off setting time elapses without an operation of any operation keys 14, power may be turned off, e.g., device 1 may transition to a power-off state.

Figure 5:
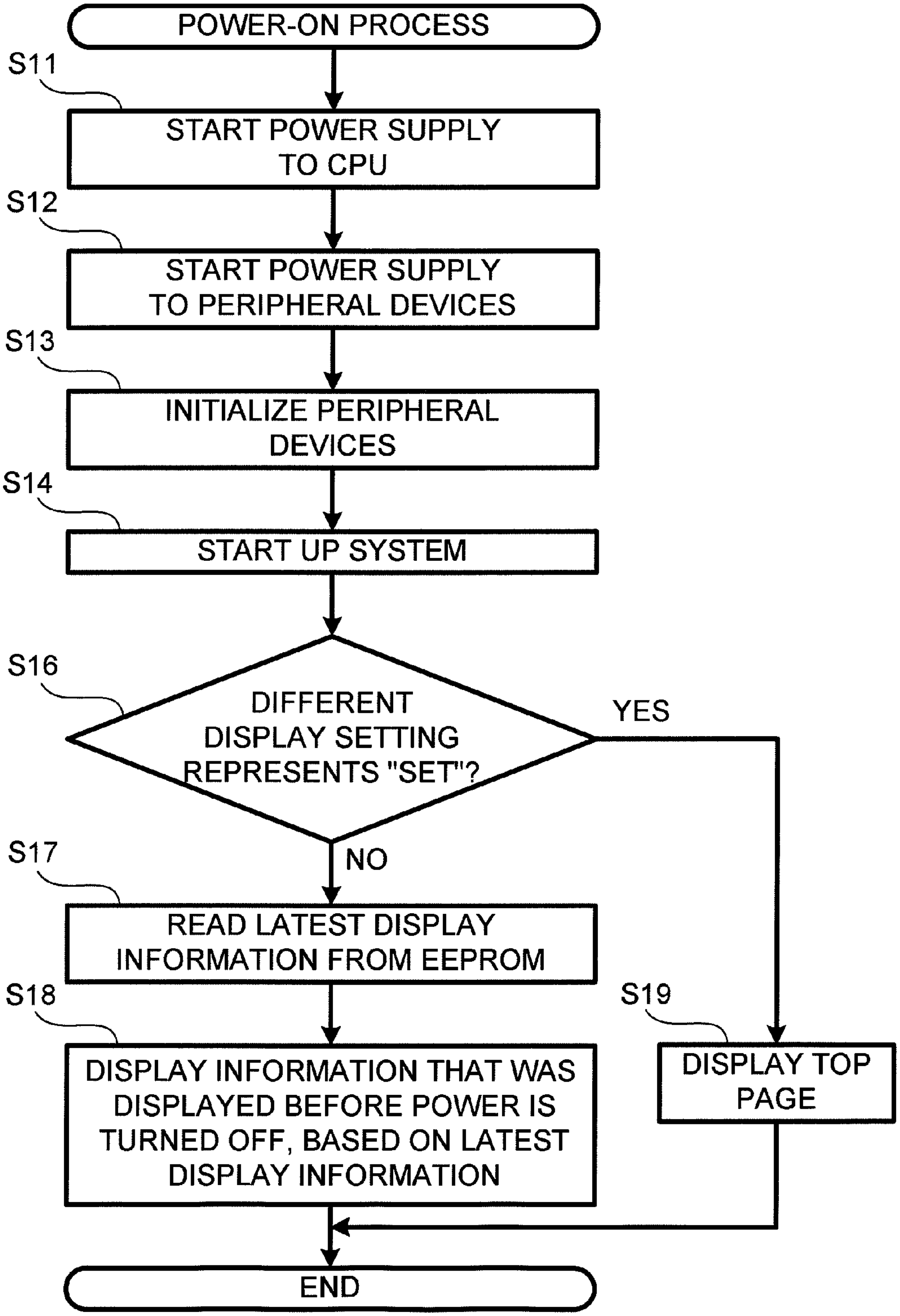
FIG. 5 is a flowchart showing a process performed in the portable display device, according to an embodiment of the invention.

FIG. 5 shows a power-on process that may be performed when power is turned on, e.g., when power key 15 or operation key 14 is pressed. In this process, at Step S11, power supply to CPU 10 may start. Then, at Step S12, power supply to the peripheral devices may start, and at Step S13, the peripheral devices may be initialized. At Step S14, CPU 10 may start up the system. At Step S16, CPU 10 may determine whether a different display setting in EEPROM 18 represents "set." The different display setting in EEPROM 18 may represent whether the different display setting is set, as power-off display information, to information displayed in display portion 21 immediately before power is turned off. The different display setting may be stored in EEPROM 18 at Step S64 of FIG. 6, which will be described in further detail herein. When CPU 10 determines that the different display setting in EEPROM 18 represents "set," e.g., "YES" at Step S16, processing may proceed to Step S19. When CPU 10 determines that the different display setting in EEPROM 18 represents "not set," e.g., "NO" at Step S16, processing may proceed to Step S17.

At Step S17, CPU 10 may read latest display information from EEPROM 18. Latest display information may represent information that was displayed in display portion 21 before power is turned off, e.g., before device 1 transitions to a power-off state. The latest display information may be stored in EEPROM 18 in Step S56 of FIG. 6. Based on the latest display information read from EEPROM 18, at Step S18, CPU 10 may display the information that was displayed before power is turned off. When the different display setting in EEPROM 18 represents "not set," CPU 10 may control display portion 21, which may display a power-off image, e.g., as shown in FIG. 4C when device 1 is in the power-off state, to display the information that was displayed before power is turned off, e.g., the e-mail message shown in FIG. 4A. At Step S19, CPU 10 may display the top page. Thus, when the different display setting represents "set," CPU 10 may control display portion 21 to display a top page, e.g., the top page shown in FIG. 4D.

When the different display is not set as the power-off display information, the information that was displayed immediately before power is turned off, may be restored and displayed again in display portion 21 when power is turned on. In another embodiment, for example, the information that was displayed immediately before power is turned off, may be restored and displayed again when power is turned on, with power key 15 and any of operation keys 14 pressed simultaneously, regardless of whether the different display is set as the power-off display information. In yet another embodiment, the information that was displayed immediately before power is turned off may not be restored, when the continuing display and the different and continuing display is set as the power-off display information. In this case, the information that was displayed immediately before power is turned off, may not be restored, so that Step S56, in which the latest display information may be retracted to EEPROM 18, may be omitted. In this embodiment, power key 15 may be disposed in device 1. In another embodiment, power key 15 may be omitted and any key may function as power key 15 by pressing and holding the key for a while.

Figure 6:
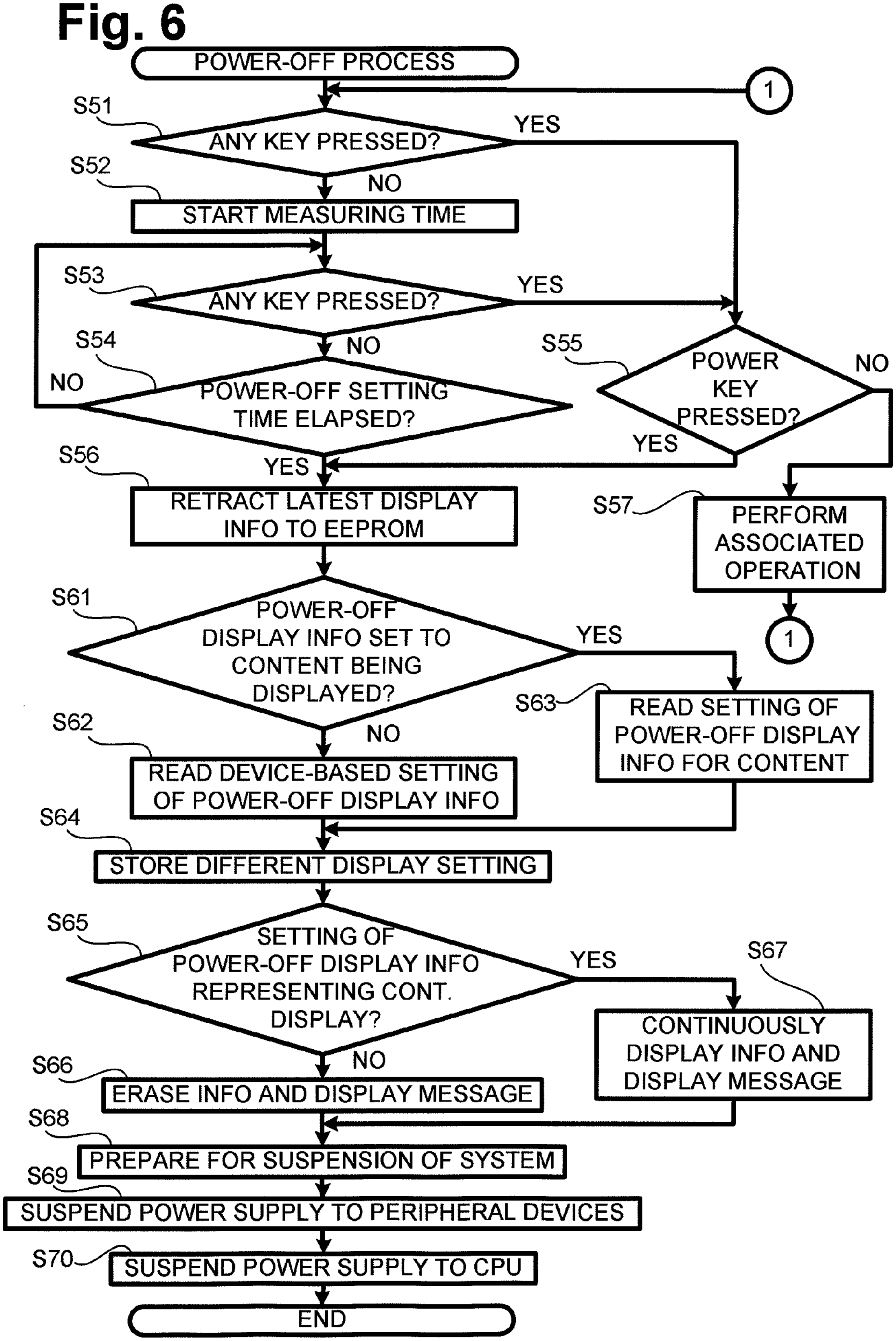
FIG. 6 is a flowchart showing a process performed in the portable display device, according to an embodiment of the invention.

FIG. 6 shows a power-off process which may be invoked at a timing when device 1 is in a power-on state and transitions to a power-off state. CPU 10 may determine at Step S51 whether any key is pressed. When CPU 10 determines that any key, e.g., any of operation keys 14, or power key 15, is pressed, e.g., "YES" at Step S51, processing may proceed to Step S55. When CPU 10 determines that a key is not pressed, e.g., "NO" at Step S51, then at Step S52, CPU 10 may start measuring time elapsed since a key has been pressed, using a timer.

At Step S53, CPU 10 again may determine whether any key is pressed. When CPU 10 determines that any key, e.g., any of operation keys 14 or power key 15 is pressed, e.g., "YES" at Step S53, processing may proceed to Step S55. When CPU 10 determines that a key has not been pressed, e.g., "NO" at Step S53, then processing may proceed to Step S54. At Step S54, CPU 10 may determine in Step S54 whether the power-off setting time has elapsed. The power-off setting time may be stored in EEPROM 18 in Step S103 or Step S104 of FIG. 7, discussed in more detail herein. When CPU 10 determines the power-off setting time has elapsed, e.g., "YES" at Step S54, then processing may proceed to Step S56. When CPU 10 determines the power-off setting time has not elapsed, e.g., "NO" at Step S54, processing may return to Step S53.

If a key is pressed, e.g., "YES" at Steps S51 or S53, then at Step S55, CPU 10 may determine whether the key pressed is power key 15. When CPU 10 determines that the key pressed is power key 15, e.g., "YES" at Step S55, then processing may proceed to Step S56. When CPU 10 determines that the key pressed is not power key 15, e.g., "NO" at Step S55, then processing may proceed to Step S57. At Step S57, CPU 10 may perform an operation associated with the pressed key. After CPU 10 performs the operation, processing may return to Step S51.

When device 1 is in a power-on state, and the power-off setting time elapses without any key operation, e.g., "YES" at Step S56, processing may proceed to Step S56. When power key 15 is pressed in a power-on state, processing also may proceed to Step S56. At Step S56, CPU 10 may retract, e.g., move or copy, latest display information to EEPROM 18. The latest display information may comprise information to identify the content being displayed in display portion 21, and also may comprise the number of pages of the content. Because the latest display information may be stored in EEPROM 18, then even when device 1 is in a power-off state, CPU 10 may recognize, when power is turned on, the information that was displayed in display portion 21 immediately before power is turned off.

When the different display setting is not set as the power-off display information, the information that was displayed immediately before power is turned off, may be restored and displayed again in display portion 21, when power is turned on. In another embodiment of the invention, device 1 may be configured such that the information that was displayed immediately before power is turned off may be restored and displayed again when power is turned on, by pressing power key 15 and any of operation keys 14 simultaneously, regardless of whether the different display setting is set as the power-off display information. In yet another embodiment of the invention, the information that was displayed immediately before power is turned off may not be restored when the continuing display setting or the different and continuing display setting is set as the power-off display information. In this case, the information that was displayed immediately before power is turned off, may not be restored. In this embodiment, Step S56, in which the latest display information may be retracted to EEPROM 18, may be omitted.

At Step S61, CPU 10 may determine whether the power-off display information is set to the content being displayed in display portion 21. This determination may be based on whether the power-off display table for contents stores the content being displayed in display portion 21 as an object for which power-off display information is set. When CPU 10 determines that the power-off display information is set to the content being displayed in display portion, e.g., "YES" at Step S61, then processing may proceed to Step S63. At Step S63, the setting of the power-off display information for the content may be read out from memory card 23, and processing may proceed to Step S64. At Step S64, based on the read setting of the power-off display information, the different display setting may be stored in EEPROM 18. Then, processing may proceed to Step S65.

When CPU 10 determines that the power-off display information is not set to the content being displayed in display portion 21, e.g., "NO" at Step S61, then processing may proceed to Step S62. At Step S62, the setting of the power-off display information corresponding to device 1, which may be stored in the power-off display table for the device, may be read from EEPROM 18. Then, processing may proceed to Step S65. Thus, CPU 10 may recognize the different display setting even after power is turned off, e.g., after device 1 transitions to the power-off state. In an embodiment of the invention, even when the information displayed at Step S61 in display portion 21 is not a content, processing may proceed to Step S62. For example, while the top page is displayed in display portion 21 at Step S61, processing may proceed to Step S62.

At Step S65, CPU 10 may determine whether the setting of the power-off display information read from EEPROM 18 represents the continuing display setting. When CPU 10 determines that the setting of the power-off display information represents the continuing display, e.g., "YES" at Step S65, the information being displayed in display portion 21 may be continuously displayed in display portion 21, and at Step S67, the message, "Power off" may be displayed in the lower portion of the display area of display portion 21, e.g., the footer portion. Then, processing may proceed to Step S68.

When CPU 10 determines that the setting of the power-off display information read from EEPROM 18 does not represent the continuing display, e.g., "NO" at Step S65, the information being displayed in display portion 21 may be erased, and at Step S66, the message, "Power off" may be displayed in the lower portion of the display area of display portion 21, e.g., the footer portion. Then, processing may proceed to Step S68.

At Step S68, CPU 10 may prepare for the suspension of the system, e.g., CPU 10 may output an instruction to the peripheral devices to stop their operation. Then, at Step S69, the power supply to the peripheral devices may be suspended. At Step S70, the power supply to CPU 10 may be suspended. Thus, power may be turned off, and device 1 may transition from a power-on state to a power-off state.

A setting in the power-off display table for device 1, e.g., the setting referred to in Steps S61 and S65, settings may be made with a user's operation, and may be stored in EEPROM 18. Based on the power-off display information settings, CPU 10 may display, in a power-off state, the preset information, e.g., power-off image, in the first mode, e.g., the different display setting and the different and continuing display setting. When device 1 is in a power-off state in the second mode, e.g., the continuing display setting, CPU 10 may continuously display information that was displayed in display portion 21 when device 1 was previously in the power-on state.

Thus, operations of keys 14 may designate one of the first mode, in which when device 1 is in a power-off state, preset information may be displayed in display portion 21, and the second mode, in which when device 1 is in a power off state, information that previously was displayed in display portion 21 when device 1 was in a power-on state may be continuously displayed. Thus, information may be displayed in display portion 21 in a mode selected by a desires, when device 1 is in a power off state. This may be convenient for a user of device 1. Moreover, device 1 may pre-store information that a user intends as the above-described preset information and may display the information in display portion 21.

Figure 7:
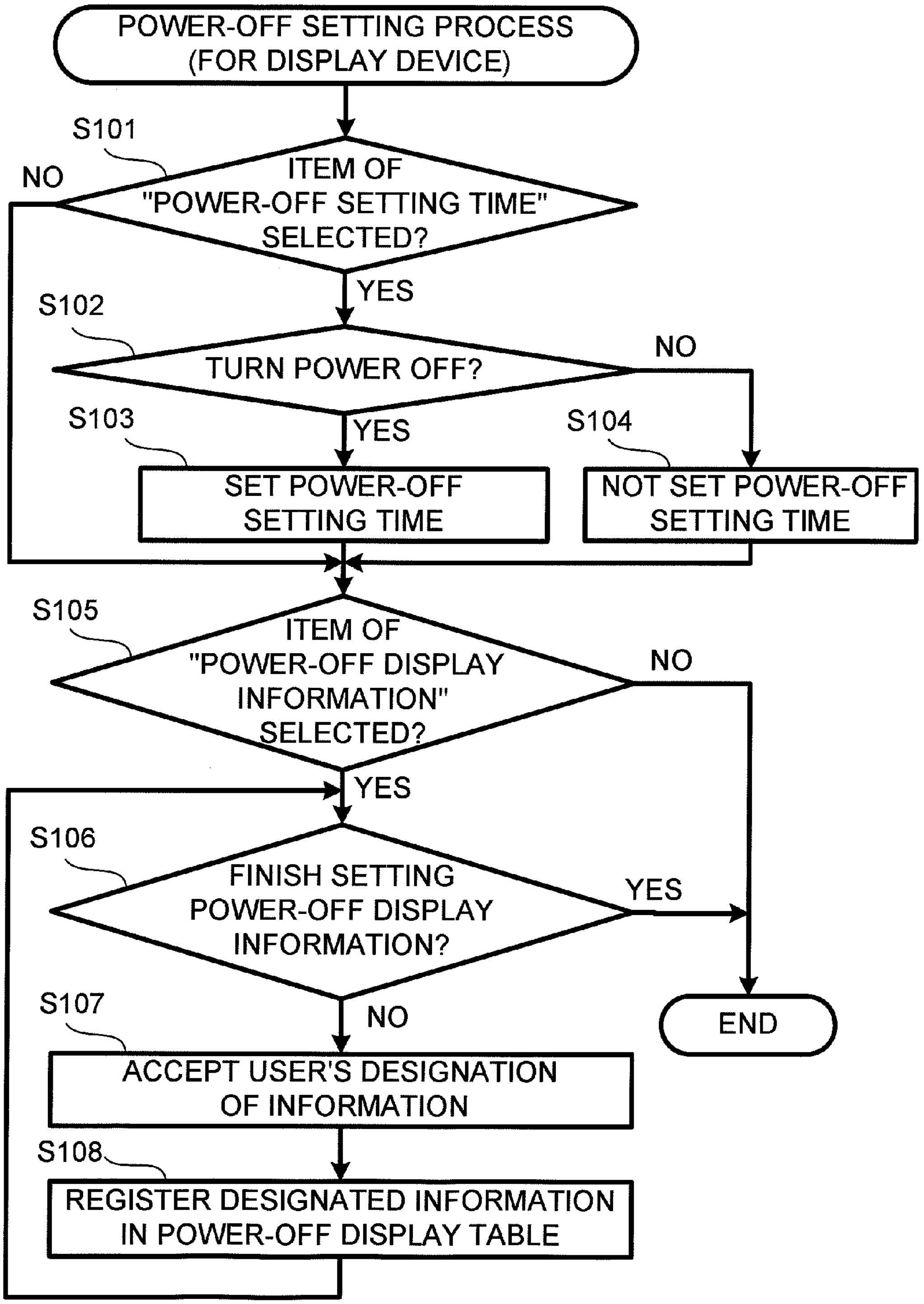
FIG. 7 is a flowchart showing a process performed in the portable display device, according to an embodiment of the invention.

Referring to FIG. 7, a power-off setting process may be performed in device 1 to set a power-off setting time and/or power-off display information. When a user performs a predetermined operation when device 1 is in a power-on state, a setting screen (not shown) may be displayed in display portion 21. Thereafter, the power-off setting process may be invoked. The screen may display items which allow a user to set a power-off setting time and power-off display information.

When the power-off setting process is invoked, then at Step S101, CPU 10 may determine whether the operation of operation keys 14 has led to selection of the "power-off setting time" item. When CPU 10 determines that the "power-off setting time" item is selected, e.g., "YES" at Step S101, CPU 10 may display a message to encourage a user to select whether to enable an auto-power off function to automatically turn power off. The user's selection may be selected using operation keys 14. At Step S102, CPU 10 may determine whether the auto-power off function power is enabled, e.g., whether power to device 1 is turned off after lapse of the setting time. This determination may be based on the user's selection. When CPU 10 determines that power to device is turned off after the setting time elapses, e.g., "YES" at Step S102, then at Step S103, CPU 10 may display a message to allow a user to input the power-off setting time, e.g., by showing a screen, e.g., the screen shown in FIG. 4F. Also at Step S103, CPU 10 may read the value input by the user, and set this value as the power-off setting time. Then, CPU 10 may display the setting screen (not shown) again. Then, processing may proceed to Step S105.

When CPU 10 determines that power to the device 1 is not to be turned off after the power-off setting time lapses, e.g., "NO" at Step S102, then at Step S104, CPU 10 may not set the power-off setting time, and may again display the setting screen (not shown). Then, processing may proceed to Step S105. Similarly, when CPU 10 determines that the item of "power-off setting time" is not selected, e.g., "NO" at Step S101, processing may proceed to Step S105.

At Step S105, CPU 10 may determine whether operations of operation keys 14 have selected an item of "power-off display information." When CPU 10 determines that the item of "power-off display information" has been selected, e.g., "YES" at Step S105, then at Step S106, CPU 10 may display a screen to allow a user to set the power-off display information, and determine whether an operation to set power-off display information is finished. When CPU 10 determines that the operation to set power-off display information is not finished, e.g., "NO" at Step S106, processing may proceed to Step S107. When CPU 10 determines that an operation to set power-off display information is finished, e.g., "YES" at Step S106, or when the item of "power-off display information" is not selected, e.g., "NO" at Step S105, processing may end.

At Step S107, CPU 10 may accept a user's designation of the power-off display information. At Step S108, CPU 10 may register the information designated by a user in the power-off display table for device 1 table for device 1. Then, processing may return to Step S106. CPU 10 may store in the power-off display table for device 1, one of the first mode, e.g., the different display setting and the different and continuing display setting, or the second mode, e.g., continuing display setting, based on a user's operation using operation keys 14.

FIG. 8 describes a power-off setting process that may be invoked by a predetermined operation in external device 200, according to an embodiment of the invention. The process may be executed after a predetermined operation is performed in external device 200, and a menu screen is displayed in display portion 221. The menu screen may list a plurality of selectable items, one of which may be the "power-off display information." Referring to FIG. 8, at Step S211, CPU 210 may determine whether operation portion 214 selects a "power-off display information" item When CPU 210 determines that the "power-off display information" is selected, e.g., "YES" at Step S111, then at Step S112, CPU 210 may display a list of contents stored in memory card 23 in display portion 221. At Step S112, CPU 210 also may display a message to allow a user to select a content to which the power-off display information may be set. At Step S113, CPU 210 may determine whether the user selected a content. When CPU 210 determines that the user selected a content, e.g., "YES" at Step S113, processing may proceed to Step S114.

When CPU 210 determines that the item of "power-off display information" is not selected (S111: NO), or a content is not selected (S113: NO), processing may proceed to Step S116. In Step S116, CPU 210 may determine whether other item is selected from the menu. When CPU 210 determines that other item is selected from the menu (S116: YES), an operation associated with the selected item may be performed in S117. Then, processing may return to Step S111. When CPU 210 determines that other item is not selected from the menu (S116: NO), processing may end.

When CPU 210 determines that the item of "power-off display information" is not selected, e.g., "NO" at Step S111, or when CPU 210 determines that the user did not select a content, e.g., "NO" at Step S113, processing may proceed to Step S116. At Step S116, CPU 210 may determine whether an other item is selected from the menu. When CPU 210 determines that an other item is selected from the menu, e.g., "YES" at Step S116, then at Step S117, an operation associated with the selected other item may be performed. Then, processing may return to Step S111. When CPU 210 determines that an other item is not selected from the menu, e.g., "NO" at Step S116, processing may end.

At Step S114, CPU 210 may accept a user's designation of power-off display information. At Step S115, CPU 210 may register the information designated by a user as a setting of the power-off display information corresponding to the content selected in Step S112. CPU 210 may store, in memory card 23, the registered setting in association with the content. Then, processing may return to Step S112.

In an embodiment of the invention, a user may select, via operation of operation keys 14, whether device 1 operates in the first mode or the second mode, regarding which information is displayed in display portion 21 when power is turned off, e.g., when device 1 is in a power-off state. Thus, information may be displayed in display portion 21 when power is turned off in a mode that a user desires, which may be convenient.

In an embodiment of the invention, CPU 10 may correspond to a controller. Display portion 21 may correspond to a non-volatile display device. Operation keys 14 may correspond to an operation device. EEPROM 18 and memory card 23 may correspond to an information storage portion. A power-off image, e.g., the image shown in FIG. 4F, may correspond to preset information.

In the above-described embodiment, the power-off display table for device 1 shown in FIG. 3A may be updated in device 1. The power-off display table for contents shown in FIG. 3B may be updated in external device 200. In another embodiment, the power-off display table for contents may be updated in device 1, and the power-off display table for device may be updated in external device 200. In the above-described embodiment, the power-off image may be adopted as the preset information. In another embodiment, other types of information may be adopted as the preset information. For information security reasons, it may be preferable that information, e.g., a content, displayed in display portion 21 immediately before power is turned off, should not be displayed or recognized when power is turned off, e.g., when device 1 is in a power-off state.

In an embodiment, power-off display may be set for device 1 and for each content. In another embodiment, power-off display information may be set for each folder containing contents, or may be set according to content types, content names, e.g., the first letter of the contents, confidentiality of contents, or security levels of contents. Examples of such embodiments will be described referring to FIGS. 9A and 9B, nevertheless these examples are merely intended to be exemplary and non-exhaustive. Similar structures and process to the above embodiment will be omitted and differences between the above embodiments and the embodiments set forth herein will be described in detail below with respect to FIGS. 9A and 9B.

FIGS. 9A-9C show power-off display tables according to an embodiment of the invention. The tables shown in FIGS. 9A-9C may be referred to in order to determine the information to be displayed in a power-off state, e.g., the power-off display information. The power-off display table may comprise a power-off display table for device 1, as shown in FIG. 9A, or a power-off display table for contents, as shown in FIG. 9B. The power-off display table for device 1 may store settings of power-off display information for device 1. The power-off display table for contents may store settings according to contents, content type, folders containing contents, content names, confidentiality of contents, and security level of contents. The power-off display table for contents may store settings in association with classification, setting objects and power-off display information.

Referring to FIG. 9B, classification may comprise contents, content types, folders containing contents, content names, confidentiality of contents, and security level of contents. The power-off display information may be set for each classification. Contents may be classified according to types, e.g., file formats of contents, categories of contents, e.g., sports, politics, and economics. Contents may also be classified according to content names, e.g., file names starting with a specific letter, e.g., the letter "A" or "B". Contents may be classified according to confidentiality, e.g., whether a content comprises confidential information. Contents may be classified according to security levels, e.g., security levels preset to contents.

Any classification, e.g., any of the classifications listed above, or similar classifications, may be selected at Step S112 of FIG. 8, instead of a content, and may be associated with the power-off display information. For example, the classification may correspond to an information type. In another embodiment, power-off display information associated with the information displayed in display portion 21 may be the same information type, e.g., classification, as that of the information displayed in display portion 21. Power-off display information may be set according to classification, using the power-off display table for contents shown in FIG. 9B. This configuration may be convenient.

Instead of four settings, e.g., the different display setting, the continuing display setting, the different and continuing display setting, and the device-based setting, a warning display and specific information setting, e.g., information 1-5 may be set as power-off display information.

When the warning display setting is active, when power is turned off, e.g., when device 1 transitions to a power-off state, information displayed in a state of power-on in display portion 21 may be erased and a warning message may be displayed in display portion 21. The warning message may inform a user that power is turned off while confidential information is being displayed. The warning display may be set for contents which may contain information identified as confidential information, and for contents whose security level is set to a predetermined level or greater. Thus, when the security level of a content being displayed in display portion 21 is set to a predetermined level or greater, or when a content being displayed in display portion 21 is set as having confidential information, a warning message may be displayed in display portion 21 when power is turned off. Thus, information security may increase.

When specific information, e.g., information 1-5, is set as power-off display information, display portion 21 may display the specific information when power is turned on, e.g., the specific information may function as the power-off image in a case where the different display setting is active. Information 1-3 may be set as power-off display information for device 1, as shown in FIG. 9A. Information 4 and 5 may be set as power-off display information for document A. Thus, a plurality of pieces of information may be set for one object, in Steps S107 or S114 (referring to FIG. 8).

When more than one, e.g., a plurality of, pieces of information is set for one object, one of the pieces of information may be displayed in display portion 21 when device 1 transitions to a power-off state, and the piece of information displayed in display portion 21 may be changed to a different piece of information at a predetermined timing until all of the plurality of pieces of information are displayed in display portion 21. In an embodiment of the invention, after each of the plurality of pieces of information are displayed, the first piece of information displayed in display portion 21 may be again displayed, and each of the pieces of information may be sequentially displayed in display portion 21 again. In another embodiment of the invention, more than one of the pieces of information may be displayed at one time in display portion 21.

In another embodiment, power-off display information associated with the information displayed in display portion 21 may be stored in a folder storing in the information displayed in display portion 21.

In the above embodiments, EEPROM 18 or memory card 23 may store contents or information about settings of the power-off display table. In another embodiment, EEPROM 18 or memory card 23 may store contents that may be supplied from another device, e.g., via a communication network, or information about settings of the power-off display table. Further, contents or information about settings of the power-off display table may be stored in EEPROM 18 of device 1, via a USB cable or other similar connection.

While the invention has been described in connection with various exemplary structures and illustrative embodiments, it will be understood by those skilled in the art that other variations and modifications of the structures and embodiments described above may be made without departing from the scope of the invention. Other structures and embodiments will be apparent to those skilled in the art from a consideration of the specification or practice of the invention disclosed herein. It is intended that the specification and the described examples are illustrative with the true scope of the invention being defined by the following claims.

What is claimed is:

1. A portable display device configured to transition between a first state and a second state, the portable display device comprising:

- a display portion configured to display information when the portable display device is in the first state and when the portable display device is in the second state;
- a power source configured to supply power when the portable display device is in the first state, and to supply less power when the portable display device is in the second state than when the portable display device is in the first state;
- a controller configured to drive the display portion to display information in the display portion;

an operation portion configured to execute at least one command in response to receipt of at least one operation; and a mode storage portion configured to store one of a first mode and a second mode, based on an operation of the operation portion, the first mode being different than the second mode, wherein the first mode corresponds to configuring preset information to be displayed in the display portion, and the second mode corresponds to configuring a particular information to be continuously displayed in the display portion, wherein the particular information corresponds to information displayed in the display portion when the portable display device is in the first state and the preset information is different from the particular information, wherein when the portable display device is in the second state, the controller is configured to display the preset information in the display portion when the first mode is stored in the mode storage portion, and to continuously display the particular information when the second mode is stored in the mode storage portion.

2. The portable display device of claim 1, further comprising an information storage portion configured to store the preset information.

3. The portable display device of claim 1, wherein the particular information corresponds to information displayed in the display portion immediately before to the portable display device transitions from the first state to the second state.

4. The portable display device of claim 1, wherein when the first mode is stored in the mode storage portion, the preset information comprises a further information associated with the particular information.

5. The portable display device of claim 2, further comprising an information storage portion configured to store the preset information, wherein when the particular information is not associated with any information, the preset information comprises information stored in the information storage portion, and wherein when the first mode is stored in the mode storage portion, the preset information is displayed in the display portion when the portable display device is in the second state.

6. The portable display device of claim 4, wherein the further information is stored in a folder storing one of the particular information and information of a same information type as that of the particular information.

7. The portable display device of claim 4, wherein the controller is configured to display a warning display in the display portion when the portable display device transitions from a first state to a second state and when a security level of the particular information is greater than or equal to a predetermined security level.

8. The portable display device of claim 1, wherein the display portion is a non-volatile display portion.

9. A non-transitory computer program product having computer readable instructions stored thereon, which, when executed by a processor of a portable display device, configures the processor to perform the steps of:

driving a display portion to display information when the portable display device is in a first state, the first state corresponding to the portable display device receiving a power supply from a power source;

receiving at least one operation command from at least one operation portion;

storing one of a first mode and a second mode in a mode storage portion, the first mode being different than the second mode, wherein the first mode corresponds to displaying preset information in the display portion, and the second mode corresponds to continuously displaying a particular information, wherein the particular information corresponds to information displayed in the display portion when the portable display device is in the first state and the preset information is different from the particular information;

transitioning the portable display device from the first state to a second state, the second state corresponding to the portable display device receiving less power than when the portable display device is in the first state;

displaying the preset information in the display portion when the portable display device is in the second state and the first mode is stored in the mode storage portion; and continuously displaying, when the portable display device is in the second state and the second mode is stored in the mode storage portion, information displayed in the display portion when the portable display device is in the first state.

* * * * *